Jan. 11, 1938.                R. B. FERGUSON                2,104,858
MANUFACTURE OF SULPHURIC ACID
Filed Jan. 23, 1935
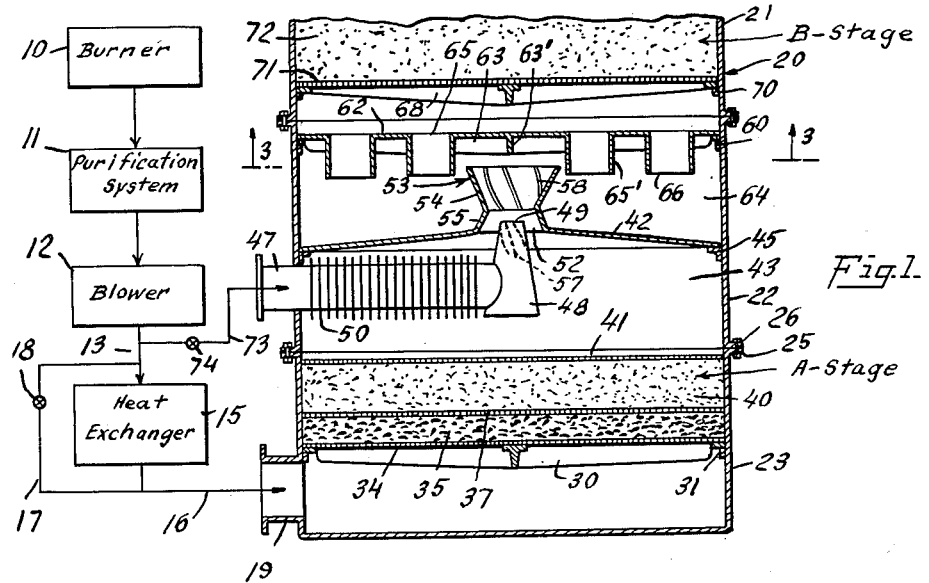
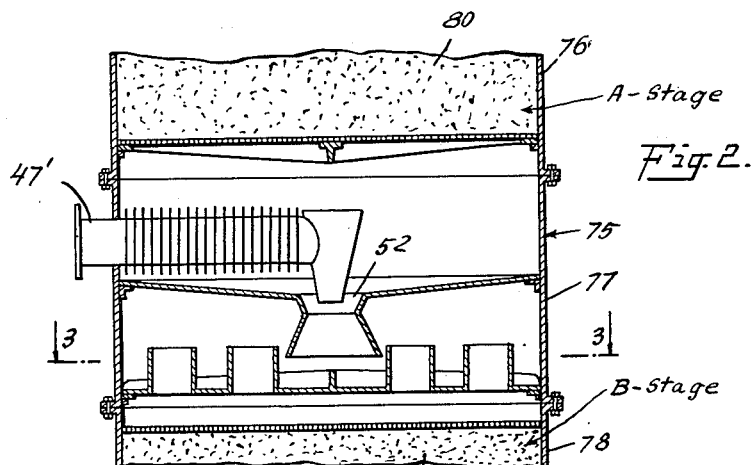
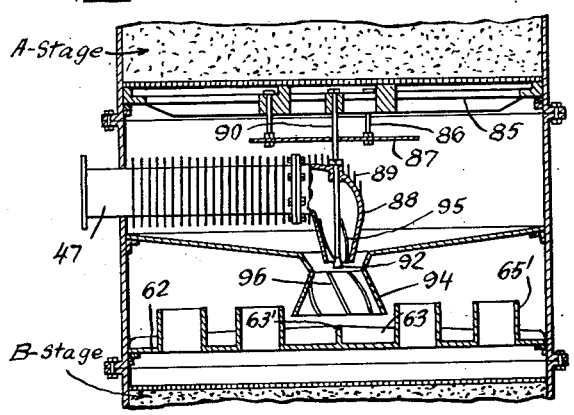
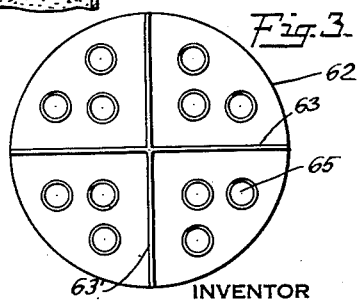
INVENTOR
Robert B. Ferguson
BY
ATTORNEY Patented Jan. 11, 1938

2,104,858

UNITED STATES PATENT OFFICE 2,104,858

MANUFACTURE OF SULPHURIC ACID

Robert B. Ferguson, Plainfield, N. J., assignor to General Chemical Company, New York, N. Y., a corporation of New York Application January 23, 1935, Serial No. 3,015

14 Claims. (Cl. 23—176)

This invention relates to methods and apparatus for mixing gases used in the manufacture of sulphuric acid by the contact process.

In making sulphuric acid by the contact process, a gas mixture containing sulphur dioxide and oxygen is contacted under certain temperature conditions with a suitable catalyst, and sulphur dioxide is oxidized to sulphur trioxide. The oxidation operation is usually carried out in two or more stages, and since the reaction is exothermic, cooling of the gas stream between stages is necessary to maintain proper conversion temperatures. To accomplish this cooling, in commercial practice it has been generally customary to insert a heat transferrer between each conversion stage. This procedure requires employment of separate units of apparatus, i. e. the heat exchangers and also the necessary equipment associated with each heat exchanger to circulate a cooling fluid through the heat transferrers to reduce the temperature of the gas stream. Construction and maintenance of the heat transferrers and associated parts constitutes a substantial item of expense in a contact sulphuric acid plant.

Previous proposals suggest ways by which use of heat transferrers between the conversion stages may be avoided. However, when attempting to operate in practice without heat exchangers and bring about cooling of the reacting gas stream for example by introduction of cool gas between reaction stages, a further problem is presented in connection with provision of a mixture of the reacting gas stream and the freshly introduced cooling gas. It has been found that in order to control the temperatures of the conversion reaction, or to supply oxygen thereto and also control the temperature by introduction of gas between conversion stages, a very efficient mixture of reaction gas and introduced gas should be formed so that all parts of the gas stream entering the succeeding conversion stage should be the same with respect to temperature and composition. Accordingly, it is a particular object of the invention to provide methods and apparatus for use in the manufacture of sulphuric acid by the contact process, by means of which methods and apparatus a cool gas may be introduced into a reacting gas stream so as to provide a uniform mixture of reacting and cooling gas to regulate the temperature of the reacting gas stream, or to simultaneously regulate the temperature of the reacting gas stream and supply thereto such quantities of oxygen as may be needed for completion of the conversion reaction.

The invention comprises method and apparatus improvements exemplified in the following specification. For a fuller understanding of the invention, the objects and advantages thereof, reference may be had to the following description taken in connection with the accompanying drawing, in which Fig. 1 shows in vertical section a portion of a two-stage converter including a preferred embodiment of the mixing device constituting part of the invention,—Fig. 1 also showing diagrammatically such other units of a sulphuric acid plant as facilitate an understanding of the operation and advantages of the invention;

Fig. 2 is a vertical section of a modified type of converter including a modified form of gas mixer;

Fig. 3 is a plan view, on a reduced scale, taken approximately on lines 3—3 of Figs. 1 and 2; and Fig. 4 is a vertical section of a modified type of converter including a preferred form of gas mixer.

Referring to Fig. 1 of the drawing, 10 indicates a burner which may, for example, be a mechanical multi-hearth furnace for roasting sulphur ores to produce a sulphur dioxide gas mixture. The burner gases pass through a purification system 11 which may be of the type shown in Herreshoff U. S. Patents 940,595, November 16, 1909, and 1,113,437, October 13, 1914. The sulphur dioxide gas stream is withdrawn from the purification system by a blower 12, the pressure side of which opens into a gas pipe 13 connected to the inlet end of a heat exchanger 15. Gases heated in transferrer 15 are discharged into gas main 16 communicating with inlet 19 of converter 20. Gas line 17, containing a control valve 18, is a by-pass around heat exchanger 15 affording provision for accurate temperature control of the gas in conduit 16.

The preferably cylindrical, vertically elongated two-stage converter 20 shown in vertical cross-section comprises principally a top section 21, an intermediate gas mixer section 22, and a bottom section 23. As indicated on the drawing, these sections may be detachably connected as by flanges 25 and bolts 26.

In lower section 23, grid 30, resting on a circular angle iron 31, supports a screen or perforated plate 34 on which may be placed filtering material 35, such as crushed firebrick. Disposed upon the upper surface of the filtering material is a second perforated plate 37 forming a support for a bed of catalytic material 40, constituting conversion stage A. With sulphur dioxide gas relatively free of impurities the filtering material 35 may be omitted if desired. The top of the catalyst material 40 is covered by a perforated plate 41 which with the underside of a dome-shaped diaphragm 42 and a portion of section 22 forms a gas collecting chamber 43. Diaphragm 42 is supported by circular angle iron 45, and is positioned at about the middle of mixer section 22 so that the gas collecting chamber 43 is of substantial size.

Projecting through the side of the mixer section 22 is a cooling gas inlet pipe 47 which extends inwardly to the vertical center of the converter and is provided on the inner end with a gas nozzle 48. The sides of the nozzle taper toward the upper end in which is a discharge opening 49 preferably of a diameter substantially less than that of inlet pipe 47. As indicated on the drawing, a plurality of spaced-apart fins 50 are mounted on that portion of inlet pipe 47 lying within gas collecting chamber 43. The purpose of these fins will hereinafter appear.

In the center of diaphragm 42 is a circular opening 52 to the edge of which is welded or otherwise attached a gas mixing throat 53 made preferably by joining together the smaller ends of frusto-conical shaped sections 54 and 55, thus forming in effect a Venturi tube. The discharge end of nozzle 48 is positioned within the throat 53, but preferably does not extend as far as the most restricted portion of the throat. To give the gas discharged from nozzle 48 and the combined gas stream passing through throat 53 a whirling motion, suitable vanes 57 and 58 may be placed in nozzle 48 and throat 53 respectively.

Supported near the top of mixer section 22 by circular angle iron 60 is a port plate 62 having on the under side diametrically arranged supporting ribs 63 and 63' projecting vertically from the plate a substantial amount. As shown in the drawing, plate 62 is positioned above diaphragm 42 an appreciable distance in order to provide a gas mixing chamber 64 of substantial size between diaphragm 42 and the port plate. Cut in plate 62 are several circular openings 65 each provided with a downwardly projecting sleeve 65'. The length of sleeves 65' is such that the lower or inlet ends 66 lie in a horizontal plane appreciably below the horizontal plane of the upper edge of throat 53. The arrangement of ribs 63 and 63' and of openings 65 in plate 62 is shown, for example, in the plane of Fig. 3.

Near the lower end of top converter section 20 is a second grid 68 carried by an angle iron 70. Resting on the grid is a perforated plate 71 on which is placed a body of catalytic material 72, constituting the B conversion stage. It will be understood catalytic material 72 may be covered with a perforated plate or screen not shown, and that the top of converter section 21 is closed and provided with a gas outlet not shown.

In the apparatus of Fig. 2, the reacting gas stream is passed downwardly as distinguished from the upflow of Fig. 1. Converter 75 of Fig. 2 comprises a top section 76, an intermediate gas mixer section 77, and a lower section 78. Catalytic material 80 comprises the A stage of conversion, and catalytic material 81 the B stage. From inspection of the drawing, it will be seen the construction of gas mixer section 77 is substantially the same as mixer section 22 of the converter of Fig. 1 except that in mixer section 77 the parts are turned upside-down.

The converter of Fig. 4 is similar to that of Fig. 2, that is, during operation the gases pass downwardly. Suspended from grid 85 by hangers 86 is a circular deflecting plate 87 centered with respect to the vertical axis of the converter. The nozzle 88 mounted in the inner end of gas inlet pipe 47 is preferably stream-lined as shown in the drawing, and is provided with fins 89. Supported by grid 85 and passing axially through nozzle 88 is a rod 90 carrying in the lower end, a cone-shaped spreader 92, the rod also acting to support the inner end of pipe 47. Nozzle 88 and throat section 94 are provided with vanes 95 and 96, and similarly pitched vanes may be placed on the cone spreader 92.

Referring to Fig. 1, in the operation of the improvements of the invention, the sulphur dioxide gases of burner 10 are passed through purification system 11, purified for example as described in the above-mentioned Herreshoff patents, and discharged from system 11 at temperatures of about 100° F.

The major portion, say roughly two-thirds, of the sulphur dioxide-oxygen gas stream is forced by blower 12 through pipe 13 into heat exchanger 15 in which the temperature of the incoming gas mixture is raised to optimum initial conversion temperature, say about 750° F. Preheating of the gas may be effected in any desirable manner, for example the hot gases discharged from B stage 72 of converter 20 may be piped through heat exchanger 15, in which case, if a third conversion stage is employed, exchanger 15 functions as the heat interchanger between the B and the C stages of conversion. Thus, heat generated in the B conversion stage may be utilized to heat up the relatively cold incoming sulphur dioxide gas mixture to reactive temperature. By regulation of valve 18, if needed, a small amount of cold gas may be by-passed through pipe 17 and introduced into pipe 16 to insure proper adjustment of the temperature of the gas as it enters inlet 19 of converter 20.

The sulphur dioxide-oxygen gas mixture passes upwardly through filtering material 35, and then into and through the A stage of conversion. In this operation, a portion of the sulphur dioxide is oxidized to sulphur trioxide and the temperature of the gas stream is raised by heat of conversion to say 1050 to 1100° F. Before further oxidation of sulphur dioxide to sulphur trioxide may be economically effected, the gas stream should be cooled to around 800° F. In accordance with the modification shown in Fig. 1, cooling of the reaction gas is brought about by introducing into the gas stream regulated quantities of cool sulphur dioxide tapped off of line 13 between blower 12 and heat exchanger 15. The desired amount of sulphur dioxide gas at temperatures of around 100° F. is introduced into gas inlet pipe 47 through pipe 73 controlled by the valve 74.

The reacting gas stream in the converter emerging from plate 41 rises through gas collecting chamber 43 and is directed by the diaphragm 42 into the lower end of the Venturi throat 53. In accordance with the preferred mode of procedure to effect a better mixture of reacting and introduced gases, operating conditions should be such that the velocity of the introduced gas as discharged from the opening 49 of nozzle 48 should be greater than the velocity of the reacting gas stream on passing the end of nozzle 48. This condition prevails in the embodiment of the invention illustrated.

The cooling gas enters pipe 47 at a higher pressure than exists in the reacting gas stream in collecting chamber 43 because of the resistance offered to passage of the reacting gas stream while passing through the heat exchanger 15, filter bed 35, and the A conversion stage. The higher pressure of the cool gas in pipe 47 causes the gas to be discharged from the end of nozzle 48 at a velocity greater than the velocity of the reacting gas stream entering the throat 53 from the gas collecting chamber 43. On account of this higher velocity of the cool gas discharged from the nozzle 48, and also because of the Venturi tube configuration of throat 53 and vanes 57 and 58 (preferably pitched in the same direction) which give a whirling motion to the gases, an efficient mixture of the reacting gas and the incoming cooling gas is obtained.

The combined gas stream discharged from the upper end of throat 53 impinges on the underside of port plate 62 and is directed violently downward toward the upper surface of diaphragm 42. Ribs 63 and 63' above the throat in effect divide the main gas stream into four streams and aid in making the final gas mixture homogeneous. Accordingly, in chamber 64 a further mixing of the gas is effected. Turbulent motion of the gases during passage through the Venturi throat and through chamber 64 mixes the two gases so that the gas stream passing upwardly through sleeves 65' and into the second stage of conversion is uniform as to temperature and composition. The ports 65 in the port plate 62 are properly spaced for example as illustrated in Fig. 3 to provide uniform distribution of gas in the space beneath the catalyst body 72 comprising the B-stage of conversion. It is to be noted however, all of ports 65 are out of alignment with throat 53, and that the lower ends of sleeves 65' extend below the upper edge of throat 53. This arrangement causes all of the gas, after discharge from throat 53, to flow initially downward before entering sleeves 65', thus furthering the mixing operation.

It has been noted the gas entering converter 20 through pipe 47 is at relatively low temperatures in the neighborhood of 100° F. The gas rising through collector chamber 43 may contain sulphuric acid which if permitted to condense would deleteriously affect the apparatus. While introducing relatively cold gas through pipe 47 if no precautions were taken, instances might arise in which sulphuric acid would condense on pipe 47 and nozzle 48 and cause substantial damage. In accordance with another phase of the invention difficulties of this nature may be overcome by providing a suitable number of properly spaced apart fins attached to the outer surface of that portion of pipe 47 lying within collecting chamber 43. The outer surface of nozzle 48 may also be provided with suitably arranged fins not shown on the drawing. As indicated, the temperature of the gas in chamber 43 is around 1050-1100° F. The fins increase the amount of heat absorbed from the hot reacting gases and effect an efficient transfer of heat from the reacting gases to pipe 47 and nozzle 48 and maintain the temperature thereof above the dewpoint of sulphuric acid, and thus prevent condensation of acid on pipe 47 and nozzle 48. It will be understood the number and spacing of the fins may be chosen in accordance with the particular operating conditions to effect the results described.

Procedure when using the converter of Fig. 2 is substantially the same as already described with reference to Fig. 1, except that the gases are passed downwardly through the converter rather than upwardly as in converter 20 of Fig. 1. In Fig. 2, if cooling intermediate the A and B stages of conversion is to be effected by introducing the cooled sulphur dioxide gas through pipe 47', operations are substantially the same as described, it being understood the main incoming gas stream is passed first through the A conversion stage 80, and the cool sulphur dioxide gas is fed into pipe 47' as by means of a pipe as 73 of Fig. 1. In the mixing device of Fig. 4, the deflecting plate 87 serves to spread the downflowing gas stream and direct the same toward the annular opening immediately surrounding the lower end of nozzle 88. The increasingly restricted nozzle end increases the velocity of gas entering through pipe 47, and the cone-shaped spreader 92 gives gas issuing from nozzle 88 an initial outward impetus which together with plate 87, the Venturi throat, vanes 95 and 96, ribs 63 and 63', plate 62 and sleeves 65' cause remarkably efficient mixing of the gases.

The converters of Figs. 1, 2 and 4 are well suited for conducting a somewhat different type of operation while still utilizing the advantages of the invention. For example, a relatively strong sulphur dioxide gas containing an insufficient amount of oxygen to support commercially complete oxidation of sulphur dioxide to sulphur trioxide may be formed in any desired manner and introduced into converter 20 of Fig. 1 through pipe 19. In the A stage of conversion, part or all of the available oxygen is consumed in oxidizing part of the sulphur dioxide to sulphur trioxide, and also the temperature of the gas stream rises to say 1050-1100° F. or higher. When working with a gas mixture of this type, to facilitate further economic conversion of sulphur dioxide to sulphur trioxide, the reacting gas stream must be cooled and further quantities of oxygen supplied thereto. In this situation, cold preferably dried air may be introduced into the converter through inlet pipe 47 in quantities such as to satisfy the oxygen requirements and to cool the gas stream down to temperatures suitable for further conversion in the B-stage.

I claim:

1. In a multi-stage converter for the oxidation of sulphur dioxide to sulphur trioxide by the contact process, a gas mixer disposed between conversion stages for forming a mixture of gases comprising a casing, a partition in said casing forming in the casing and on opposite sides of the partition a gas collecting chamber and a gas mixing chamber, an opening in said partition, a Venturi tube associated with said opening, the inlet end of said tube communicating with said collecting chamber and the discharge end of the tube opening into said mixing chamber, means for supplying reacting gas to said collecting chamber from a preceding conversion stage and for causing said reacting gas to pass successively through the collecting chamber, the tube and the mixing chamber, means for introducing a second gas into the reacting gas stream axially of the direction of flow of said reacting gas and at a point adjacent the inlet end of the tube, and a gas outlet for the gas mixing chamber out of alignment with the said tube and communicating with a succeeding conversion stage.

2. In a multi-stage converter for the oxidation of sulphur dioxide to sulphur trioxide by the contact process, a gas mixer disposed between conversion stages for forming a mixture of gases comprising a casing, a partition in said casing forming on one side of the partition a gas collecting chamber, a port plate on the opposite side of the partition forming with the partition and a portion of the casing a gas mixing chamber, an opening in said partition, a conduit associated with said opening, the inlet end of said conduit communicating with said collecting chamber and the discharge end of the conduit opening into said mixing chamber at a point adjacent the port plate, means for supplying reacting gas to said collecting chamber and for causing the gas to pass successively through the collecting chamber, the conduit and the mixing chamber, means for introducing a second gas into the reacting gas at a point adjacent the inlet end of the conduit, an opening in the port plate out of alignment with the said conduit and communicating with a succeeding conversion stage, a second conduit associated with the opening in the port plate, said conduit extending toward the partition and terminating in a plane between the partition and a plane extending through the discharge end of the first mentioned conduit.

3. In a multi-stage converter for the oxidation of sulphur dioxide to sulphur trioxide by the contact process, a gas mixer disposed between conversion stages for forming a mixture of gases comprising a casing, a partition in said casing forming on one side of the partition a gas collecting chamber, a port plate on the opposite side of the partition forming with the partition and a portion of the casing a gas mixing chamber, an opening in said partition, a Venturi tube associated with said opening, the inlet end of said tube communicating with said collecting chamber and the discharge end of the tube opening into said mixing chamber at a point adjacent the port plate, means for supplying reacting gas to said collecting chamber from a preceding stage of conversion and for causing the reacting gas to pass successively through the collecting chamber, the tube and the mixing chamber, a gas inlet pipe provided with a plurality of outwardly extending fins and having a discharge nozzle positioned within said tube for introducing a gas into the sulphur dioxide gas as the latter flows through the tube, a plurality of discharge ports in said plate, each port being out of alignment with the tube and communicating with a succeeding conversion stage, a sleeve associated with each port in the plate, said sleeves extending toward the partition and each sleeve terminating in a plane between the partition and a plane extending through the discharge end of the tube.

4. A sulphur dioxide converter comprising a shell, a gas inlet at one end of the shell, a gas outlet at the other end of the shell, a body of catalytic material adjacent each end of the shell, a gas mixer between said bodies of catalytic material, said mixer comprising a casing constituting a portion of the shell, a partition in said casing forming on one side of the partition a gas collecting chamber, a port plate on the opposite side of the partition forming with the partition and a portion of the casing a gas mixing chamber, an opening in said partition, a Venturi tube associated with said opening, the inlet end of said tube communicating with said gas collecting chamber and the discharge end of the tube opening into said gas mixing chamber at a point adjacent the port plate, means for causing reacting gas to pass successively through a body of catalytic material, the mixer, and the second body of catalytic material, a gas inlet pipe having a discharge nozzle positioned within said tube for introducing a second gas into the reacting gas as the latter flows through the tube, a plurality of discharge ports in said plate each port being out of alignment with the tube, a sleeve associated with each port in the plate, said sleeves extending toward the partition and each sleeve terminating in a plane between the partition and a plane extending through the discharge end of the tube.

5. The method for forming a mixture of sulphur dioxide and another gas which comprises passing a stream of sulphur dioxide gas through a restricted passage to thereby increase the velocity of flow of the sulphur dioxide gas, introducing a second gas, moving at a velocity in excess of the velocity of the sulphur dioxide gas on entering the restricted passage, into the sulphur dioxide gas while the latter is flowing through the restricted passage, and then causing at least part of the combined gases to flow in a direction opposite to the initial direction of flow of the combined gases.

6. The method for forming a mixture of sulphur dioxide gas and another gas comprising passing a stream of sulphur dioxide gas through a restricted passage to thereby increase the velocity of flow of such gas, introducing a second gas, moving at a velocity in excess of the velocity of the sulphur dioxide gas on entering the restricted passage, into the sulphur dioxide gas while the latter is flowing through the restricted passage, imparting a whirling motion to said gases while the latter are flowing through the passage, and then causing at least part of the combined gases to flow in a direction opposite to the initial direction of flow of the combined gases.

7. In a multi-stage converter for the oxidation of sulphur dioxide to sulphur trioxide by the contact process, a gas mixer disposed between conversion stages for forming a mixture of gases comprising a casing, a partition in said casing forming in the casing and on opposite sides of the partition a gas collecting chamber and a gas mixing chamber, a gas passage in said partition, means for supplying reacting gas to said collecting chamber from a preceding stage of conversion and for causing the reacting gas to pass successively through the collecting chamber, the passage and the mixing chamber, means for introducing a second gas into the reacting gas at a point adjacent the passage, means for dividing the resulting gas stream and for reversing the flow of gas in the mixing chamber, and a gas outlet for the mixing chamber communicating with a succeeding conversion stage.

8. In a multi-stage converter for the oxidation of sulphur dioxide to sulphur trioxide by the contact process, a gas mixer disposed between conversion stages for forming a mixture of gases comprising a casing, a partition in said casing forming in the casing and on opposite sides of the partition a gas collecting chamber and a gas mixing chamber, a gas passage in said partition, means for supplying reacting gas to said collecting chamber from a preceding stage of conversion and for causing the reacting gas to pass successively through the collecting chamber, the passage, and the mixing chamber, means comprising a stream-line nozzle having a cone-shaped spreader in the mouth thereof for introducing a second gas into the reacting gas while the latter is flowing through the passage, and a gas outlet for the gas mixing chamber out of alignment with the said passage and communicating with a succeeding stage of conversion.

9. In a multi-stage converter for the oxidation of sulphur dioxide to sulphur trioxide by the contact process, a gas mixer disposed between conversion stages for forming a mixture of gases comprising a casing, a partition in said casing forming on one side of the partition a gas collecting chamber, a port plate on the opposite side of the partition forming with the partition and a portion of the casing a gas mixing chamber, an opening in said partition, a Venturi tube associated with said opening, the inlet end of said tube communicating with said collecting chamber and the discharge end of the tube opening into said mixing chamber at a point adjacent the port plate, means for supplying reacting gas to said collecting chamber from a preceding stage of conversion and for causing the reacting gas to pass successively through the collecting chamber, the tube and the mixing chamber, a gas pipe having a stream-line discharge nozzle having a cone-shaped spreader in the mouth thereof positioned within said tube for introducing a second gas into the reacting gas as the latter flows through the tube, a plurality of discharge ports in said plate, each port being out of alignment with the tube and communicating with a succeeding stage of conversion, a sleeve associated with each port in the plate, said sleeves extending toward the partition and each sleeve terminating in a plane between the partition and a plane extending through the discharge end of the tube.

10. In a multi-stage converter for the conversion of sulphur dioxide to sulphur trioxide by the contact process a gas mixer disposed between conversion stages for forming a mixture of gases comprising a casing, a partition in said casing forming on one side of the partition a gas collecting chamber, a port plate on the opposite side of the partition forming with the partition and a portion of the casing a gas mixing chamber, a gas passage in the partition, means for supplying reacting gas to said collecting chamber from a preceding conversion stage and for causing said reacting gas to pass successively through the collecting chamber, the passage and the mixing chamber, means for introducing a second gas into the reacting gas at a point adjacent the passage, and a mixing chamber gas outlet in the port plate out of alignment with the passage and communicating through a gas space beyond said plate with a succeeding conversion stage.

11. In a multi-stage converter for the conversion of sulphur dioxide to sulphur trioxide by the contact process a gas mixer disposed between conversion stages for forming a mixture of gases comprising a casing, a partition in said casing forming on one side of the partition a gas collecting chamber, a port plate on the opposite side of the partition forming with the partition and a portion of the casing a gas mixing chamber, an opening in the partition, a Venturi tube associated with said opening, the inlet end of said tube communicating with said collecting chamber and the discharge end of the tube opening into said mixing chamber, means for supplying reacting gas to said collecting chamber from a preceding conversion stage and for causing said reacting gas to pass successively through the collecting chamber, the tube, and the mixing chamber, means for introducing a second gas into the reacting gas at a point adjacent the inlet end of the tube, and a mixing chamber gas outlet in the port plate out of alignment with the tube and communicating through a gas space beyond said plate with a succeeding conversion stage.

12. In a multi-stage converter for the conversion of sulphur dioxide to sulphur trioxide by the contact process a gas mixer disposed between conversion stages for forming a mixture of gases comprising a casing, a partition in said casing forming on one side of the partition a gas collecting chamber, a port plate on the opposite side of the partition forming with the partition and a portion of the casing a gas mixing chamber, a gas passage in the partition, means for supplying reacting gas to said collecting chamber from a preceding conversion stage and for causing said reacting gas to pass successively through the collecting chamber, the passage and the mixing chamber, means for introducing a second gas into the reacting gas at a point adjacent the passage, means for reversing flow of gases in the mixing chamber, and a mixing chamber gas outlet in the port plate out of alignment with the passage and communicating through a gas space beyond said plate with a succeeding conversion stage.

13. In a multi-stage converter for the conversion of sulphur dioxide to sulphur trioxide by the contact process a gas mixer disposed between conversion stages for forming a mixture of gases comprising a casing, a partition in said casing forming on one side of the partition a gas collecting chamber, a port plate on the opposite side of the partition forming with the partition and a portion of the casing a gas mixing chamber, an opening in the partition, a Venturi tube associated with said opening, the inlet end of said tube communicating with said collecting chamber and the discharge end of the tube opening into said mixing chamber, means for supplying reacting gas to said collecting chamber from a preceding conversion stage and for causing said reacting gas to pass successively through the collecting chamber, the tube and the mixing chamber, means for introducing a second gas into the reacting gas while the latter is flowing through the tube, and a mixing chamber gas outlet in the port plate out of alignment with the tube and communicating through a gas space beyond said plate with a succeeding conversion stage.

14. In a multi-stage converter for the oxidation of sulphur dioxide to sulphur trioxide by the contact process, a gas mixer disposed between conversion stages for forming a mixture of gases comprising a casing, a partition in said casing forming in the casing and on opposite sides of the partition a gas collecting chamber and a gas mixing chamber, a gas conduit in said partition, means for supplying reacting gas to said collecting chamber from a preceding conversion stage and for causing said reacting gas to pass successively through the collecting chamber, the conduit and the mixing chamber, means for introducing a second gas into the reacting gas at a point adjacent the conduit, and a gas outlet for the mixing chamber out of alignment with the said conduit, communicating with a succeeding conversion stage, and opening into said mixing chamber in a plane between the partition and a plane extending through the discharge end of the conduit.

ROBERT B. FERGUSON.